L. G. Binkly,
Flour Bolt.
No. 110,425.  Patented Dec. 27, 1870.
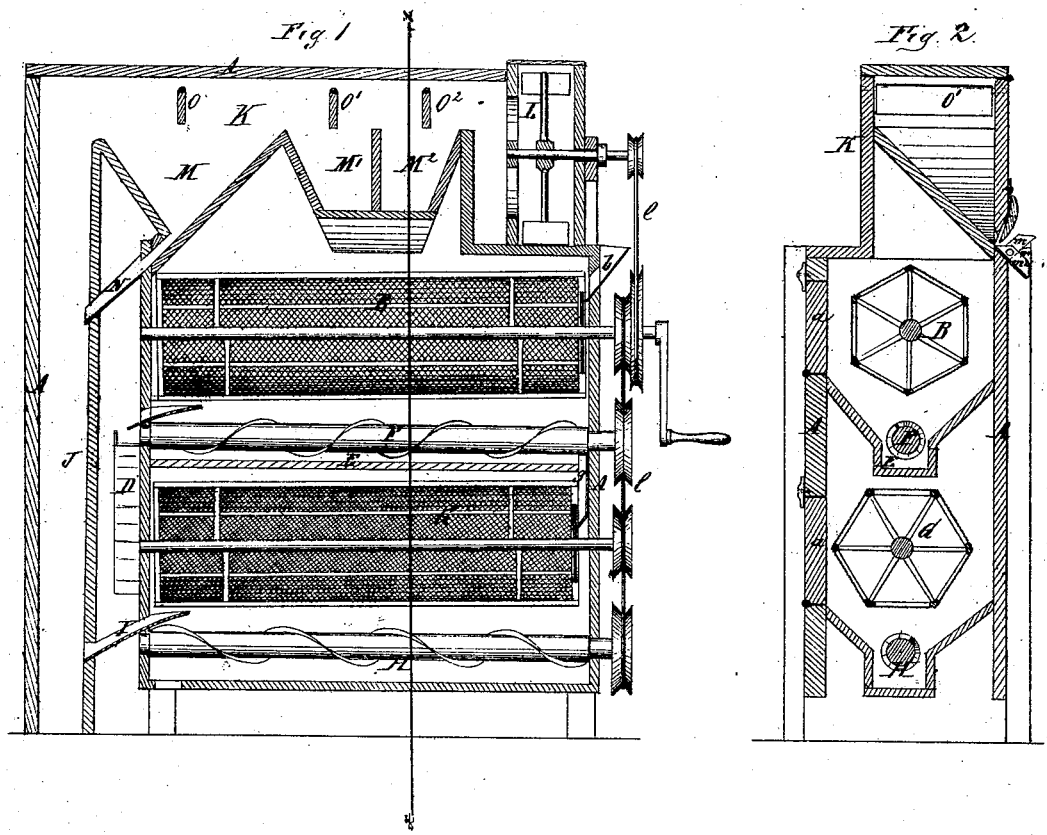

UNITED STATES PATENT OFFICE.

LEMUEL G. BINKLY, OF BAUGHMAN, OHIO.

IMPROVEMENT IN MIDDLINGS-PURIFIERS.

Specification forming part of Letters Patent No. 110,425, dated December 27, 1870.

*To all whom it may concern:*

Be it known that I, LEMUEL G. BINKLY, of Baughman, in the county of Wayne and State of Ohio, have invented a new and Improved Middlings-Purifier; and I do hereby declare the following to be a full, clear, and exact description of the same, reference being had to the accompanying drawing making a part of this specification, in which—

Figure 1 is a vertical section through the line $x\ x$ of Fig. 2. Fig. 2 is a vertical section through the line $y\ y$ of Fig. 1.

The object of this invention is to provide for public use a thoroughly-effective machine for purifying middlings, both from feed and shorts on the one hand, and from fine flour on the other. To accomplish this object the machine is so constructed that the middlings are passed first through a reel covered with coarse cloth, which separates and removes the coarse feed and shorts, and allows the fine feed, middlings, and flour to fall through upon a conveyer, which discharges them into a reel covered with fine cloth. This reel separates the middlings and fine feed from the flour, allowing the latter to be dropped upon a conveyer, which discharges it at the proper point, while the feed and middlings are discharged at another point into the lower end of an air-tube, through which a strong upward current of air is kept in motion by a fan at the upper part of the machine. The middlings and feed are carried by the air-current up at the end and over along the top of the machine, and are caused to strike against a series of adjustable separating-deflectors, which cause one quality of middlings or feed to be collected in one hopper, and thence conveyed into the air-chute again, and another quality to be gathered into another hopper, and thence returned to the first conveyer, and a third quality to be collected in still another hopper, and thence properly disposed of, &c., until all the middlings and feed have been thus separated according to their quality, and conveyed to their appropriate places.

The invention consists in the construction and arrangement of devices, as specifically stated in the claims.

In the drawings, A represents the frame or case of the machine, provided with appropriate doors $a\ a$, through which access can be had to its interior. B is a reel, covered with coarse bolting-cloth, which receives the impure middlings through a spout, $b$, and, after separating the coarse feed and shorts from the middlings and flour, discharges the former at the end of the reel into a spout, D, which carries them off, and drops the middlings and flour into a horizontal spout, E, where a screw-conductor, F, carries them back to the position directly under the spot where the middlings first entered the machine. There they are discharged through a spout, $g$, into a second reel, G, covered with fine bolting-cloth, which allows the flour to drop through upon another conductor, H, but conveys the fine feed and middlings along to the farther side of the machine, discharging them into an inclined spout, I. J is a vertical air-tube at the end of the machine, into the lower end of which the spout I delivers the fine feed and middlings. This air-tube is connected at its upper end to a horizontal box, K, extending along the top of the machine, and terminating in a fan, L, which, when set in operation by belts $l\ l\ l$, draws a strong current of air up through tube J, and over through box K. In box K is a series of hoppers, M M$^1$ M$^2$, &c., the first, M, discharging into the vertical tube J, the second, M$^1$, discharging either out of the machine or back into conducting-box E or H, according as a gate, $m$, is opened or closed, and the third, M$^2$, discharging out of the machine at $m^2$. Over these hoppers, and directly in the way of the air-current, are adjustable deflectors O O$^1$ O$^2$, arranged so as to more or less intercept the current, as they are made to hang vertically or obliquely across its line of direction, and their object being to arrest the particles of feed, middlings, &c., and cause them to drop into the hoppers beneath.

The coarse middlings, mixed with feed, &c., will be arrested in hopper M, and returned to tube J through spout N. The coarse middlings mixed with feed, which pass over and beyond the hopper M, will be arrested in hopper M, and, if sufficiently pure, gate $m$ will be opened, and they will be delivered into a suitable receptacle; but if not sufficiently pure, gate $m$ will be closed, and they will be returned to the reels. The fine feed will be carried along to hopper $M^2$, and discharged through the spout $m^2$.

The tube J is made wider at the top than the bottom.

Having thus described my invention, what I claim as new, and desire to secure by Letters Patent, is—

1. The hinged deflectors $O\ O^1\ O^2$, arranged in the chamber K with reference to the air-tube J, fan L, and hoppers $M\ M^1\ M^2$, provided, respectively, with the spout N, gate $m$, and spout $m^2$, as herein shown and described, for the purpose specified.

2. The arrangement, with the reels B and G, and conductors F H I, of the air-pipe J, chamber K, hoppers $M\ M^1\ M^2$, spouts N I, and hinged deflectors $O\ O^1\ O^2$, substantially as herein shown and described.

LEMUEL G. BINKLY.

Witnesses:
 JOS. T. K. PLANT,
 JAMES H. EMBRY.